(12) United States Patent
Shepard

(10) Patent No.: US 11,623,483 B2
(45) Date of Patent: Apr. 11, 2023

(54) OUTPUT DEVICE FOR TRAILER BACKING SYSTEM

(71) Applicant: Daniel Robert Shepard, Stratham, NH (US)

(72) Inventor: Daniel Robert Shepard, Stratham, NH (US)

( * ) Notice: Subject to any disclaimer, the term of this patent is extended or adjusted under 35 U.S.C. 154(b) by 1056 days.

(21) Appl. No.: 16/354,567

(22) Filed: Mar. 15, 2019

(65) Prior Publication Data

US 2019/0283513 A1   Sep. 19, 2019

Related U.S. Application Data

(60) Provisional application No. 62/682,614, filed on Jun. 8, 2018, provisional application No. 62/643,277, filed on Mar. 15, 2018.

(51) Int. Cl.

| | |
|---|---|
| *B60D 1/00* | (2006.01) |
| *B60D 1/06* | (2006.01) |
| *B60D 1/26* | (2006.01) |
| *B60D 1/36* | (2006.01) |
| *B60R 1/00* | (2022.01) |
| *B62D 13/06* | (2006.01) |
| *B60D 1/24* | (2006.01) |
| *B62D 1/00* | (2006.01) |

(52) U.S. Cl.
CPC ............... *B60D 1/245* (2013.01); *B60D 1/36* (2013.01); *B62D 1/00* (2013.01); *B60D 1/06* (2013.01); *B60D 1/26* (2013.01); *B60R 1/003* (2013.01); *B62D 13/06* (2013.01)

(58) Field of Classification Search
CPC ... B60D 1/00; B60D 1/06; B60D 1/26; B60D 1/36; B60D 1/245; B60R 1/003; B62D 13/06
USPC .......................................................... 701/41
See application file for complete search history.

(56) References Cited

U.S. PATENT DOCUMENTS

| | | | |
|---|---|---|---|
| 3,605,088 A | * | 9/1971 | Savelli ................... B60K 37/00 280/448 |
| 3,689,695 A | | 9/1972 | Rosenfield et al. |
| 4,214,266 A | | 7/1980 | Myers |
| 4,277,804 A | | 7/1981 | Robison |
| 5,027,200 A | | 6/1991 | Petrossian et al. |
| 5,274,432 A | | 12/1993 | Parent |
| 5,289,321 A | | 2/1994 | Secor |
| 5,452,982 A | | 9/1995 | Engle |
| 5,530,421 A | | 6/1996 | Marshall et al. |
| 5,771,861 A | | 6/1998 | Musser et al. |
| 5,831,519 A | | 11/1998 | Pedersen et al. |
| 5,949,331 A | | 9/1999 | Schofield et al. |
| 6,148,212 A | | 11/2000 | Park et al. |
| 6,222,447 B1 | | 4/2001 | Schofield et al. |
| 6,236,917 B1 | | 5/2001 | Liebl et al. |
| 6,408,232 B1 | | 6/2002 | Cannon |
| 6,498,620 B2 | | 12/2002 | Schofield et al. |
| 6,505,106 B1 | | 1/2003 | Lawrence et al. |
| 6,526,340 B1 | | 2/2003 | Reul et al. |

(Continued)

*Primary Examiner* — Joshua E Rodden

(57) ABSTRACT

The present invention relates to display means for systems for guiding a trailer while backing, and in particular to graphical display means to provide information to an operator who is steering, and controlling the accelerator and brakes by suggesting the amount of steering to apply to the towing vehicle to cause the trailer to be directed to where the operator wants the trailer to go.

20 Claims, 6 Drawing Sheets

(56) References Cited

U.S. PATENT DOCUMENTS

| | | | |
|---|---|---|---|
| 6,564,122 B1 | 5/2003 | Huertgen et al. | |
| 6,570,385 B1 | 5/2003 | Roberts et al. | |
| 6,701,232 B2 | 3/2004 | Yamaki | |
| 6,701,233 B2 | 3/2004 | Namaky et al. | |
| 6,751,536 B1 | 6/2004 | Kipersztok et al. | |
| 6,801,849 B2 | 10/2004 | Szukala et al. | |
| 6,807,469 B2 | 10/2004 | Funkhouser et al. | |
| 6,813,561 B2 | 11/2004 | MacNeille et al. | |
| 6,816,760 B1 | 11/2004 | Namaky | |
| 6,871,121 B2 | 3/2005 | Tomson | |
| 6,882,917 B2 | 4/2005 | Pillar et al. | |
| 6,919,803 B2 | 7/2005 | Breed | |
| 6,957,133 B1 | 10/2005 | Hunt | |
| 7,103,460 B1 | 9/2006 | Breed | |
| 7,135,964 B2 | 11/2006 | Namaky et al. | |
| 7,164,117 B2 | 1/2007 | Breed et al. | |
| 7,171,769 B2 | 2/2007 | Schultz et al. | |
| 7,184,074 B1 | 2/2007 | Jansen | |
| 7,184,862 B2 | 2/2007 | Pillar et al. | |
| 7,209,813 B2 | 4/2007 | Namaky | |
| 7,370,983 B2 | 5/2008 | DeWind et al. | |
| 7,690,737 B2 | 4/2010 | Lu | |
| 7,825,782 B2 | 11/2010 | Hermann | |
| 7,911,324 B2 | 3/2011 | Breed et al. | |
| 7,950,751 B2 | 5/2011 | Offerle et al. | |
| 8,010,252 B2 | 8/2011 | Getman et al. | |
| 8,035,508 B2 | 10/2011 | Breed | |
| 8,036,792 B2 * | 10/2011 | Dechamp | B62D 13/06 701/41 |
| 8,068,019 B2 | 11/2011 | Bennie et al. | |
| 8,138,899 B2 | 3/2012 | Ghneim | |
| 8,308,182 B2 | 11/2012 | Ortmann et al. | |
| 8,310,363 B2 | 11/2012 | Breed | |
| 8,731,627 B2 | 5/2014 | Inabathuni et al. | |
| 8,757,735 B2 | 6/2014 | Marsden et al. | |
| 8,825,328 B2 * | 9/2014 | Rupp | G05D 1/0212 701/72 |
| 9,102,271 B2 * | 8/2015 | Trombley | B62D 13/06 |
| 9,102,272 B2 * | 8/2015 | Trombley | B60R 1/00 |
| 9,129,528 B2 * | 9/2015 | Lavoie | G08G 1/167 |
| 9,168,871 B2 | 10/2015 | Soderlind et al. | |
| 9,211,811 B2 | 12/2015 | Breed | |
| 9,233,710 B2 | 1/2016 | Lavoie et al. | |
| 9,238,483 B2 | 1/2016 | Hafner et al. | |
| 9,248,858 B2 | 2/2016 | Lavoie et al. | |
| 9,352,777 B2 | 5/2016 | Lavoie et al. | |
| 9,373,044 B2 | 6/2016 | Wallat et al. | |
| 9,499,200 B2 | 11/2016 | Hochrein et al. | |
| 9,517,668 B2 | 12/2016 | Lavoie | |
| 9,555,832 B2 | 1/2017 | Smit et al. | |
| 9,701,265 B2 | 7/2017 | Breed | |
| 9,896,130 B2 | 2/2018 | Ghneim et al. | |
| 2004/0041942 A1 | 3/2004 | Jones | |
| 2005/0206225 A1 * | 9/2005 | Offerle | B60T 8/246 303/7 |
| 2011/0001614 A1 | 1/2011 | Ghneim et al. | |
| 2011/0001825 A1 * | 1/2011 | Hahn | B62D 13/06 348/148 |
| 2015/0115571 A1 * | 4/2015 | Zhang | B60D 1/62 280/477 |

\* cited by examiner

```
// private static int smoothSampleCount = 5, smoothIndex = 0,
//                    lastFlashBeepSide = 0, flashPct = 0;
// private static double smoothedHitchAngle=0, maxLeftHitch=0,maxRightHitch=0;
// private static double smoothSample[] = new double[smoothSampleCount];
// private static boolean reverseDirectionAlert = false;
// *************** flash and beep are determined here *********************
   if (buttonState) {        // TRUE if RESET button pressed; reset flash & beep
      maxLeftHitch = 0;                      // left side is negative hitch angle
      maxRightHitch = 0;                     // right side is positive hitch angle
      reverseDirectionAlert = false;                       // controls the beep
      flashPct = 0;                                        // controls the flash
      smoothedHitchAngle = 0;       // hitch angle averaged over last 5 readings
      for (smoothIndex = 0; smoothIndex < smoothSampleCount; smoothIndex++)
          smoothSample[smoothIndex] = 0;
   }
   smoothIndex = ++smoothIndex >= smoothSampleCount ? 0:smoothIndex; // +1 wrap
   smoothedHitchAngle -= smoothSample[smoothIndex];    // remove oldest sample
   smoothSample[smoothIndex] = hitchAngle/smoothSampleCount;  // get new sample
   smoothedHitchAngle += smoothSample[smoothIndex];          // include new sample
   if ( ((lastFlashBeepSide != 1) &&
           (smoothedHitchAngle - maxLeftHitch > 0.4f) && (hitchAngle > 0))
||
       ((lastFlashBeepSide != 1) && (smoothedHitchAngle >= 0.4f)) ||
       ((lastFlashBeepSide != -1) &&
           (smoothedHitchAngle - maxRightHitch < -0.4f) && (hitchAngle < 0))
||
       ((lastFlashBeepSide != -1) && (smoothedHitchAngle <= -0.4f)) ) {
          maxLeftHitch = 0;
          maxRightHitch = 0;
          reverseDirectionAlert = true;                  // controls the beep
          flashPct = 255;                                // controls the flash
          lastFlashBeepSide = (hitchAngle>0) ? 1: ((hitchAngle<0) ? -1 : 0);
   } // lastFlashBeepSide is hitch angle side where flash & beep last occurred
   if (hitchAngle < maxLeftHitch) maxLeftHitch = hitchAngle;        // without
   else if (hitchAngle > maxRightHitch) maxRightHitch = hitchAngle; //smoothing // ***************** UPDATE SCREEN GRAPHIC HERE !!! *******************
   drawScreenImage();
// *************************** FLASH SCREEN *******************************
   if (flashPct != 0) {
     if (flashPct < 0) { // photo-flash completed; reset trigger variable
         flashPct = 0;
     } else {                    // overlay white screen to simulate photo-flash
         paint.setARGB(flashPct, 255, 255, 255);  // set opacity of white layer
         paint.setStyle(Paint.Style.FILL);
         canvas.drawRect(topLeftX,topLeftY,botRightX,botRightY,paint);
         flashPct -= 100;          // fade white screen; smaller # - more steps
   } }
// *************************** SOUND TONES ********************************
   if (reverseDirectionAlert) {
         reverseDirectionAlert = false;
         toneGen.startTone(ToneGenerator.TONE_PROP_BEEP,100); // 100mSec pulse
   }
```

FIGURE 7

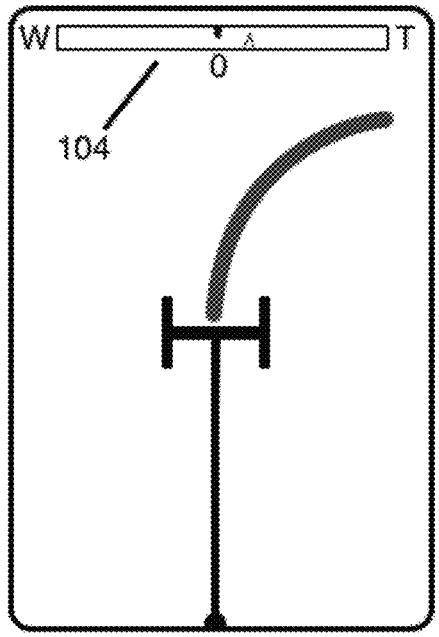
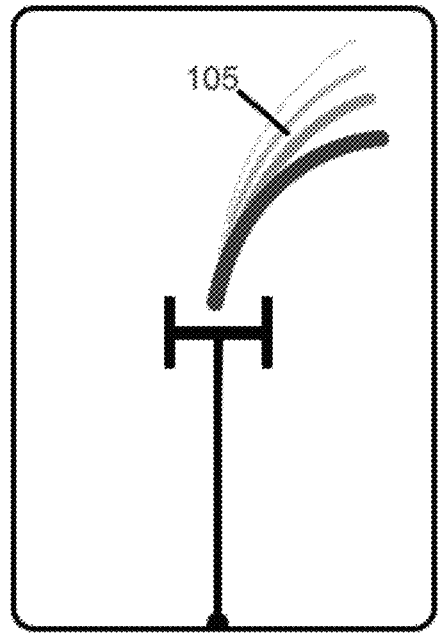
FIGURE 14 　　　　　　　　　FIGURE 15
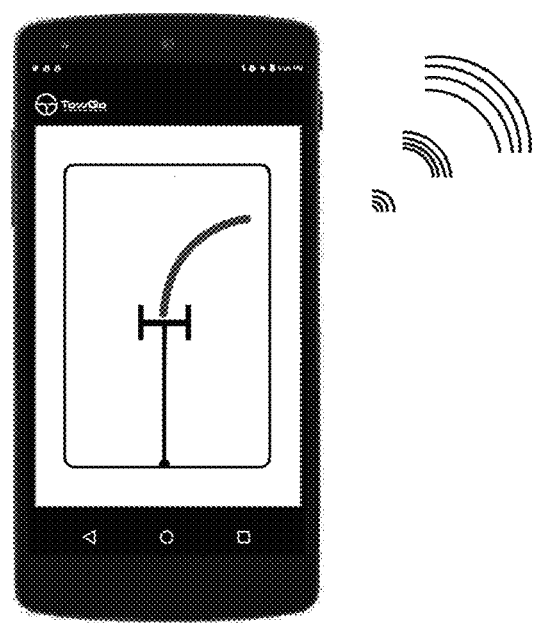
FIGURE 16

OUTPUT DEVICE FOR TRAILER BACKING SYSTEM

CROSS-REFERENCE TO RELATED APPLICATION

This patent application makes reference to and claims the benefit of U.S. Provisional Patent Application 62/682,614 by Shepard titled "TRAILER BACKING UP SYSTEM FEATURES" that was filed on Jun. 8, 2018, and to U.S. Provisional Patent Application 62/643,277 by Shepard titled "HERDING METHOD FOR BACKING TRAILERS" that was filed on Mar. 15, 2018 and those applications are incorporated herein in their entirety by reference; this patent application makes reference to U.S. Pat. No. 10,214,241 (the '241 patent) by Shepard titled "TRAILER BACKING UP SYSTEM ACCESSORIES" that issued Feb. 26, 2019, to U.S. Pat. No. 7,715,953 (the '953 patent) by Shepard titled "TRAILER BACKING UP DEVICE AND METHOD" which issued on May 11, 2010, to U.S. Pat. No. 9,132,856, by Shepard titled "TRAILER BACKING UP DEVICE AND TABLE BASED METHOD" that issued on Sep. 15, 2015 (the '856 patent), and to U.S. Pat. No. 9,926,009 (the '009 patent) by Shepard titled "PORTABLE TRAILER GUIDANCE SYSTEM" that issued on Mar. 27, 2018, and those applications are incorporated herein in their entirety by reference.

TECHNICAL FIELD

In various embodiments, the present invention relates to systems for guiding a trailer while backing and, in particular, the present invention relates to output devices used with systems for guiding a trailer while backing.

BACKGROUND

Trailers have been around for many years, yet every summer and winter one can observe the owners of boats and snowmobiles, respectively, backing up those devices on trailers with great difficulty. The problem arises from the fact that a trailer being backed-up is an inherently unstable system. A trailer being pushed wants to turn around and be pulled (i.e., to jackknife) instead. To compensate for this instability, the driver must skillfully alternate the direction of his steering so as to cause the trailer to want to turn around and be pulled from opposite sides thereby repeatedly crossing the centerline (i.e., a line through the center of the vehicle parallel with its line of travel when driving straight) of the pushing vehicle. Various innovations have been introduced to address this problem in whole or in part. Prior art reveals several attempts to address the problems associated with backing a trailer. The simplest solutions address parts of the problem ranging from ways of sensing the angle of the hitch (see: Kollitz, U.S. Pat. No. 4,122,390), to sensing and displaying the angle of the hitch (see: Gavit, U.S. Pat. No. 3,833,928), to sounding an alarm when a jackknife condition exists or is imminent (see: Kimmel, U.S. Pat. No. 4,040,006). Some display solutions attempt to let the operator know which direction to rotate the steering wheel (see: Woods, U.S. Pat. No. 4,846,094 issued Jul. 11, 1989) or to help the operator control the trailer's path, although with the assistance of an additional person to help guide and, presumably, observe the surroundings (see: Hekking, U.S. Pat. No. 2,050,948 issued Aug. 11, 1936). While these solutions are helpful, they only address a part of the problem. Shepard in his U.S. Pat. No. 7,715,953 teaches a complete working system, but requires the operator to backup slowly while focusing on a pointer that indicates the predicted direction for the trailer. When backing up with a trailer, it is an important requirement that the operator constantly survey the area around the vehicle and trailer to be aware of obstacles; the present invention teaches a solution for this requirement.

SUMMARY

The present invention relates to output devices for systems for guiding a trailer while backing, and in particular to audio alert and graphical output devices to provide information to an operator who is steering, and controlling the accelerator and brakes by indicating the timing or the amount of steering to apply to the towing vehicle to cause the trailer to be directed to where the operator wants the trailer to go when backing up along a curved path, including indications that can be communicated to the operator without requiring that operator to look away from the area around the vehicle and trailer.

BRIEF DESCRIPTION OF THE DRAWINGS

In the drawings, emphasis is generally placed upon illustrating the principles of the invention. The drawings are not necessarily to scale. In the following description, various embodiments of the present invention are described with reference to the following drawings, in which:

FIG. 7 shows an example Android device code segment for implementing a flash and beep.

FIG. 14 depicts a graphical representation of the trailer and vehicle turning radii when the vehicle radius is wider than the trailer radius where a slider represents the tightening trailer radius.

FIG. 15 depicts a graphical representation of the trailer and vehicle turning radii when the vehicle radius is tighter than the trailer radius where an animation represents the widening trailer radius.

FIG. 16 depicts an audio representation of the trailer and vehicle turning radii data.

DETAILED DESCRIPTION

The present invention relates to systems for guiding a trailer while backing up and in particular to outputting information to the operator of a system for guiding a trailer while backing up that aid the operator in steering the towing vehicle to control the direction of the trailer.

Figure 9:
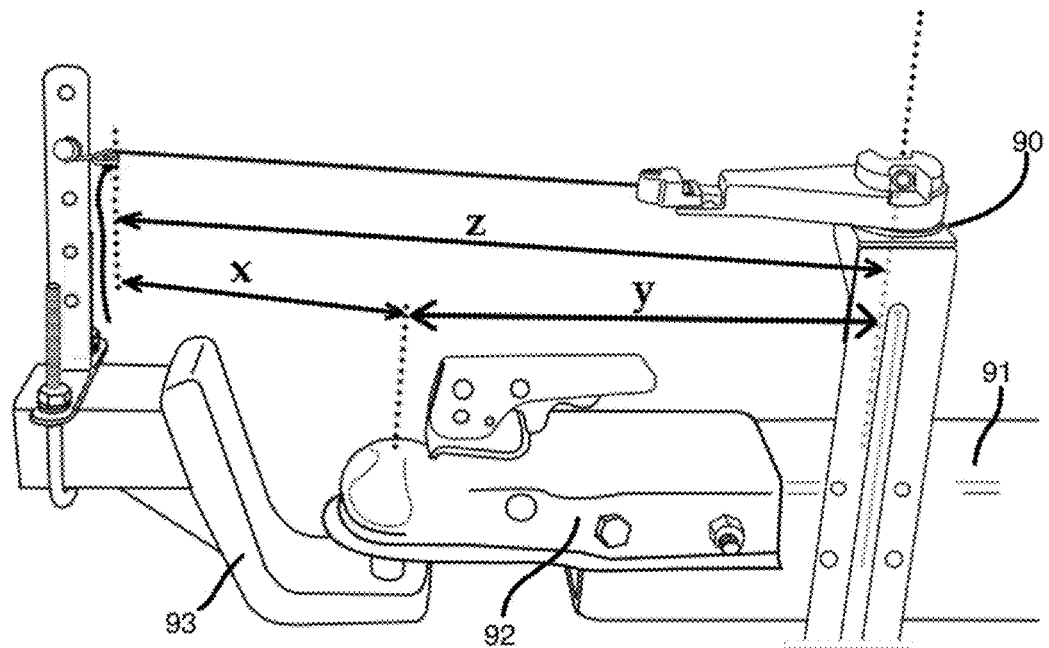
FIG. 9 depicts a sensor on a trailer for measuring a hitch angle.

In a system for aiding an operator in the backing up of a trailer by a towing vehicle, the trailer and the vehicle are coupled together by a jointed connection, the jointed connection being a coupler, 92, latched to a hitch and hitch ball, 93, where the jointed connection has a plurality of connection or articulation angles (possible hitch angles) and where each connection angle has a corresponding turning radius for the trailer. See FIG. 9 (and the '009 patent) for a depiction of a sensor, 90, mounted on the tongue of a trailer, 91, to measure the hitch angle. Likewise, the vehicle has a plurality of steering positions where each steering position has a corresponding turning radius of the vehicle. A steering position corresponds to the position of the steering wheel, the position of the steering tires (typically the front tires), and all of the intervening linkages and other connecting mechanisms.

The '953 patent teaches that given a hitch angle, $\theta$, a trailer length, $L$, and a turning radius of a vehicle, $R$, "[a] new hitch angle, $\theta'$, resulting from an incremental distance, $\Delta x$, traveled by the vehicle is expressed as: $\theta'=\theta+2 \sin^{-1}(\Delta x \sin(\theta)/2L) - 180\Delta x/\pi R$. This shall be called the backing equation."

If the hitch angle is not changing, $\theta'$ must be equal to $\theta$ and, from the '953 patent, it can be observed via this equation that the component of rotation due to the trailer, $2 \sin^{-1}(\Delta x \sin(\theta)/2L)$, and the component of rotation from the turning of the vehicle, $180\Delta x/\pi R$, must therefore be equal. This is the condition of infinite turning where, in theory in a perfect world, the turning of the vehicle ($R_V$) exactly matches the turning of the trailer ($R_T$). Stated another way, a condition of infinite turning occurs when the turning radius of the trailer, where $R_T=L/\sin(\theta)$, matches the turning radius of the vehicle, where $R_V=w/\tan(\varphi)$ where $\varphi$ is the angle of the front tires of the vehicle and w is the wheelbase, or the condition of infinite turning occurs when: $w/\tan(\varphi)=L/\sin(\theta)$. Note that both components of the backing equation contain the reciprocal of the turning radius where $180\Delta x/\lambda R$ and $2 \sin^{-1}(\Delta x \sin(\theta)/2L)$ could be rewritten as $180\Delta x/\pi R_V$ and $2 \sin^{-1}(\Delta x/2R_T)$, respectively. These rewritten equations are dependent only on $\Delta x$ and the turning radii (and are not dependent on any time parameter—this last point means a solution can be found even when the vehicle is stationary thereby enabling an operator to stop and assess a position for the steering wheel).

When an operator is backing up with a trailer, it is useful to know a sense of the magnitude of the turning of the trailer relative to the turning radius of the vehicle. Such a sense can be provided by displaying a graphic that indicates $\Delta\theta$'s magnitude and sign (for example, by a resizable arrow). When the trailer is not turning relative to the vehicle given the current hitch angle and the vehicle front wheels' angle (i.e., when $\Delta\theta=0$), the arrow can be hidden or displayed as a vertical line or a dot or as any form that does not indicate a direction with a magnitude. If the trailer is going to turn slightly farther to the left given the current hitch angle and the vehicle front wheels' angle, an arrow pointing to the left and having a small length could be shown. If the trailer is going to turn significantly farther to the left given the current hitch angle and the vehicle front wheels' angle, an arrow pointing to the left and having a long length could be shown. Since the length of the arrow can be scaled to fit the size of the display while still providing the operator with the needed sense of the magnitude, the value for $\Delta x$ can be set to 1 and the $\Delta\theta$ equation (that is, the backing equation without the initial value for $\theta$ added in, per '953) can be simplified to:

$$\Delta\theta=2 \sin^{-1}(\sin(\theta)/2L)-180 \tan(\varphi)/\pi w$$

From this equation it can be seen that the sense of the magnitude of $\Delta\theta$ can be derived from only the turning radius of the trailer and the turning radius of the vehicle:

$$\Delta\theta=2 \sin^{-1}(1/(2R_T))-180/(\pi R_V)$$

Also from the derivation of $\Delta\theta$ from the '953 teaching, for each increment of backing by the vehicle, $\Delta x$, there is a component of backing the trailer, b, and a component of rotating or turning the trailer, r, where $b=\Delta x \cos(\theta)$ and $r=\Delta x \sin(\theta)$. These two components form two sides of a force vector triangle. It is an aspect of the present invention that this force vector triangle, or at least the r component, is a useful alternate sense of the magnitude to display to the operator to inform the operator of the value of $\Delta\theta$ or a representative value for $\Delta\theta$ that gives the operator the sense of in which direction the hitch angle will change and by how much $\Delta\theta$ will change for a given amount of steering. This informing can take the form of an element such as the displayed arrow where the length of the arrow changes according to the magnitude of the value (see FIG. 10). Alternatively, a displayed element could be animated where the speed of the animation changes according to the magnitude of the value (see FIG. 22). Alternatively, a displayed element could change color or brightness according to the magnitude of the value. Alternatively, other display techniques could be employed. Alternatively, an audio signal could be sounded such as a tone that changes volume or pitch as the magnitude increases. Alternatively, any one or more of the above methods of indicating the magnitude of the value could be displayed simultaneously.

Software to implement the above graphic output elements and others described herein are well understood by those skilled in the art.

Figure 8:
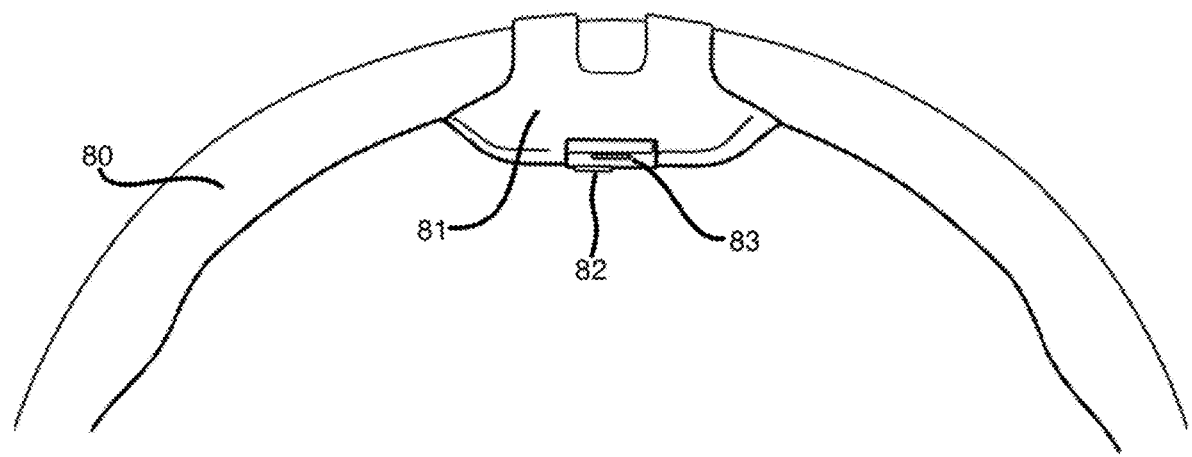
FIG. 8 depicts a sensor mounted on a steering wheel for measuring steering position.

In FIG. 8, a sensor, 81, to measure the steering position by sensing the rotation of the steering wheel, 80, has a reset button, 82, and an LED, 83. Such a sensor comprises a MEMS inertial measurement unit (IMU) comprising a three axis accelerometer and gyroscope and can measure the steering wheel's rotation. The vehicle's turning radius is computed by dividing the steering wheel's rotation (measured from its zero reference point) by the steering ratio of the vehicle to get the angle of the front steering tires; the sine of the front tire angle is then divided into the vehicle's wheelbase to obtain turning radius. Alternatively, a sensor can directly measure the position of the steering tires, or any of the intervening linkages or other interconnecting mechanisms to determine the steering position with which the turning of the vehicle (e.g., turning radius) can be computed. Implementation of steering wheel and hitch angle sensors and processing of the data sensed by such sensors can be found in the '241, '953, '856, and '009 patents wherein detailed descriptions of systems that determine the turning radii of the vehicle and trailer in real time can be found. Various equivalent values for the turning radii can be derived from the articulation angle measurement and the steering measurement without computing the actual turning radius which can be used to the same effect, and the present teaching intends not to be limited to using only the specific turning radius values. For example, the front tire angle and articulation angle can be used to the same effect when wheelbase of the vehicle and the trailer length are normalized. Sensors such as these continuously sample and provide steering wheel rotation, front wheel angle, and/or vehicle turning radius data and hitch angle and/or trailer turning radius data to the central computing component of the system.

Figure 1:
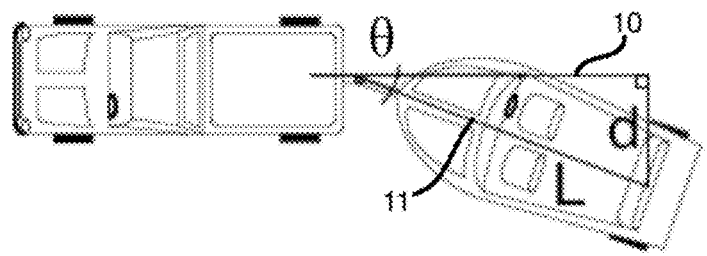
FIG. 1 depicts a vehicle towing a trailer showing the hitch angle.
Figure 2:
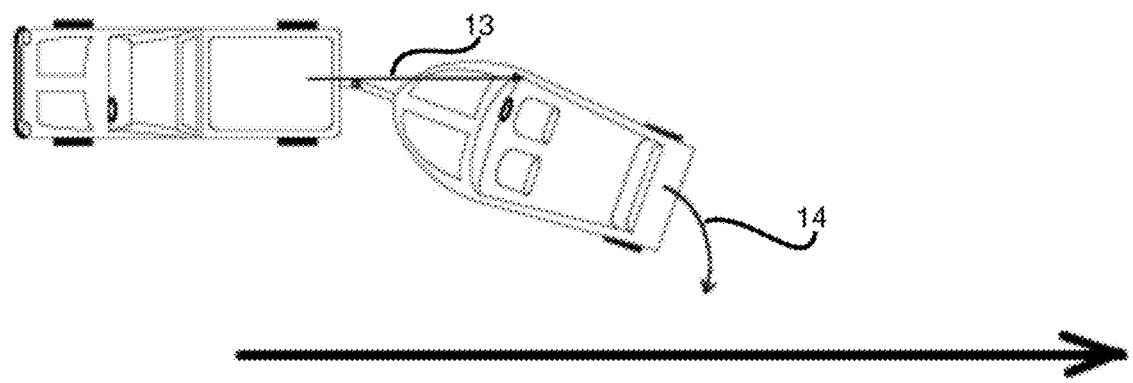
FIG. 2 depicts a vehicle towing a trailer showing the trailer turned to the left side.
Figure 3:
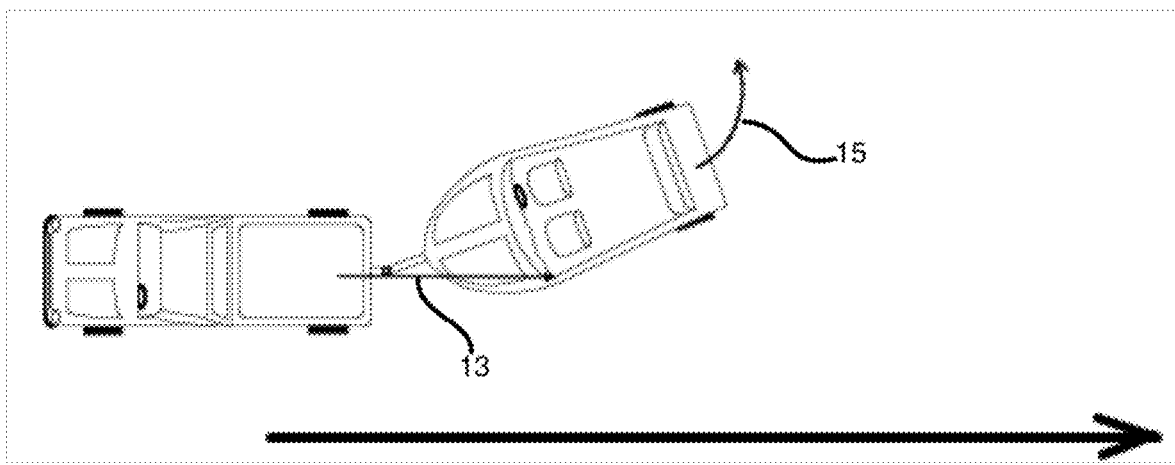
FIG. 3 depicts a vehicle towing a trailer showing the trailer turned to the right side.

In FIG. 1, the connection angle, or articulation or hitch angle, θ, is the angle formed by the centerline of the vehicle, 10, and the centerline of the trailer, 11, and it is a critical parameter to know when backing up with a trailer. When backing up a trailer, the operator of the towing vehicle wants to know when the vehicle and trailer become aligned and to which side of the vehicle's centerline of travel or vehicle's centerline, 10, the trailer is on. The typical way to reverse the direction of the trailer's rotation is to steer to align the vehicle's centerline, 10, with the trailer's centerline, 11, so as to then cause the trailer to cross from being on one side of the vehicle to being on the opposite side. When backing with a trailer, the trailer will always turn away from the vehicle's centerline, 10, while backing. This means that if the trailer is to the left side of the vehicle's centerline of travel, 13, backing will increase the trailer's angle, relative to the ground, further to the left (see FIG. 2) as indicated by arrow 14. If the trailer is to the right side of the vehicle's centerline of travel, 13, backing will increase the trailer's angle further to the right (see FIG. 3) as indicated by arrow 15.

Figures 4, 5:
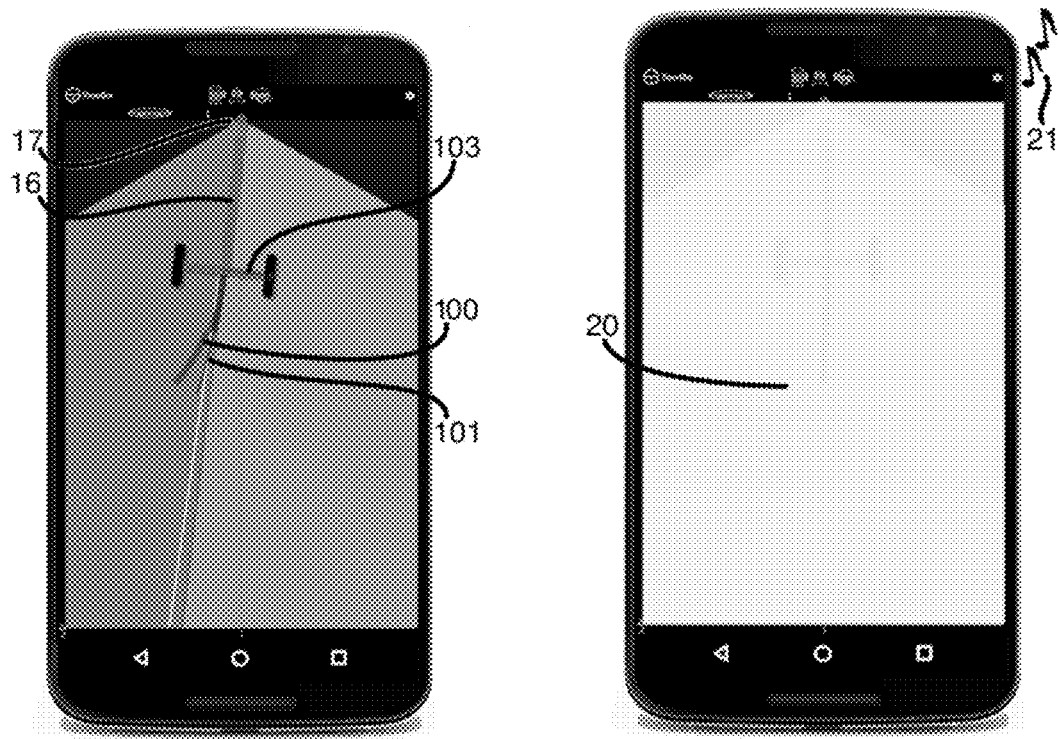
FIG. 4 depicts an output device for guiding a user while backing with a trailer.
FIG. 5 depicts an output device device when providing an alert in the form of a flash and beep.

An output device such as a display or an audio speaker is an important part of a backup system, particularly when the operator is controlling the steering, throttle and brake and operating without servo controlled or electronic power assisted steering (EPAS). FIG. 4 depicts one such display wherein a graphical representation of the area behind the vehicle and trailer (complete with a representation of a trailer, 16, and the hitch ball location, 17) is rendered. Typically, this display is a hand-held or a portable device (such as a smart phone like an Android device or iPhone or a tablet like an iPad, or some other portable or mobile device such as a laptop computer, or a portable computer) that is wirelessly connected to the trailer backup system (a wired display device could also be used but with less convenience) or an output device custom made for this purpose. This display could also be an integrated display that is built into the vehicle. For either type of display device, a wireless link could be affected using WiFi, Bluetooth, ZigBee, or any of a number of commercially available wireless protocols or a proprietary protocol using the same or other radio, visible light, or invisible light communications. This display component will communicate with other components of the system such as the electronics proximate to the hitch for the determination of the hitch angle (the hitch sensor, 90), electronics proximate to the steering for the determination of the turning radius of the vehicle (the steer sensor, 81), or other electronics or computing components for performing calculations or otherwise contributing to the determination of the trailer's predicted direction.

FIG. 5 illustrates the moment when the trailer crosses the centerline of the vehicle. The display, 20, in FIG. 5 is in a state of white-out and a narrow pulse of sound or audio chirp, 21, is sounded. White-out of the screen is accomplished by drawing (overlaying) a white rectangle over all or part of the normal display image, followed by drawing the white rectangle over the display at 50% opaque, followed by restoring the normal display. Since the display is typically refreshed anywhere from once every $\frac{1}{5}$ of a second to 60 times per second, drawing this overlay rectangle with each screen refresh, the effect of this action is to simulate a photoflash-like effect. Of course, the screen might be refreshed more or fewer times per second or the rectangle might be drawn in more than two steps (e.g., 4 steps with the opacity at 100%, 75%, 50%, 25% before going back to the normal display—the number of steps can be made a function of the screen refresh rate where a faster refresh could have more steps than a slower refresh rate which would typically have fewer steps). An example of software that is a part of a graphic drawing routine for refreshing and updating the display of an Android device is found in FIG. 7.

In the code segment in FIG. 7, flashPct and reverseDirectionAlert are variables to control the triggering of the flashing and audio alert features, respectively. When the trailer meets the alert condition (the trailer crosses the centerline of the vehicle), boolean variable reverseDirectionAlert is set to true and the variable flashPct is set to 255. Each time through the draw routine, the screen is redrawn with the shown code segment being executed as a part of the screen drawing routine.

In the last four lines of this code, if reverseDirectionAlert is true, it will be set to false (so that the tone is queued to play only once) and an impulse tone will be initiated. In the block of code just above that, if flashPct is not zero, it will be used to control the opacity of a white rectangle drawn over the refreshed display image and its value will be reduced each time (see: flashPct—=100;) until this white rectangle vanishes. This gives the effect of a photoflash that can be noticed if looking in the general direction of, but not looking directly at, the display (even if looking away from the display, the reflected light can be sufficient to notice the alert if the ambient lighting is not too bright). To prevent a premature flash and beep from a data jitter spike when the hitch angle is close to zero but may not yet have crossed zero, a smoothing function acts a low pass filter on the data to prevent such a data jitter spike from falsely triggering the flash and beep (see variables beginning with "smooth"). Also, in variables maxLeftHitch and maxRightHitch, the code tracks how far the hitch angle has moved beyond zero since the last flash and beep to ensure that the hitch angle has truly crossed zero by making sure the maximum hitch angle attained is sufficiently past zero to confirm a real zero crossing. Key variables and how they are initialized are indicated in the comments in the first five lines of the code sample. The variable hitchAngle is updated at regular intervals by a sensor on the trailer hitch that measures the articulation angle where a reading of zero corresponds to when the vehicle and trailer are aligned.

Other visual alert mechanisms can be employed in addition, including an icon (e.g., an arrow pointing towards the side to which the trailer is moving) that is momentarily displayed and may be scalable, a toggling of a color (e.g., red if to the left and green if to the right) or a graphic form that changes from one state to another as a function of which side of the vehicle's centerline the trailer is on, an animated action, or other graphically displayed items that can be shown on the screen. Likewise, either in addition to the beep and visual alerts or in lieu of the visual notifications, audio notifications can be given including more complex chirps or beeps, and synthesized, digitized and/or prerecorded audio tracks. However, a narrow pulse-like sound conveys the timing of the moment the hitch angle passes through zero. In these ways, the operator can become aware of the trailer crossing the centerline of the vehicle without having to be focused directly on the screen (e.g., by hearing the alert or by noticing the simulated photoflash-like effect out of the corner of his or her eye). Other alert mechanisms can include a strobe light in the vehicle or on the trailer or a device that makes a physical contact or a physical sensation with the operator that can be felt by the operator (e.g., a vibration as can be induced by a smart watch or a vibrator in the steering wheel or a sudden shift such as when a magnet is activated in close proximity to an iron weight). The alert can be received by the operator using the sense of vision, hearing, or touch.

Figure 6:
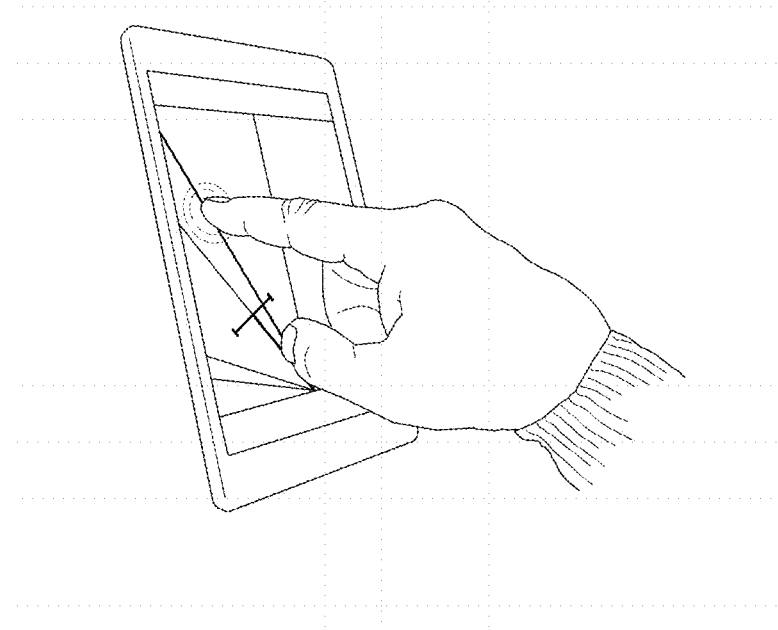
FIG. 6 depicts a touch sensitive display for guiding a user while backing with a trailer.

A variation is to enable the alert to be given not just when the trailer crosses the centerline of the vehicle (i.e., when the hitch angle is zero), but instead (or in addition) when the vehicle turning radius goes from being greater than the trailer turning radius to being less than the trailer turning radius, or the vehicle turning radius goes from being less than the trailer turning radius to being greater than the trailer turning radius. This is useful when backing up the trailer on a curved path. When the turning radius of a vehicle matches the turning radius of a towed trailer, the vehicle and trailer turn on an infinite circle (see the '241 patent). With this variation, the alert is enabled when the sign of the change of the trailer's turning radius changes from positive to negative or from negative to positive. In this way, the trigger point is the hitch angle corresponding to the trailer turning radius that equals the vehicle turning radius (as opposed to the teaching, above, in which the trigger point corresponds to a hitch angle of zero degrees). Selection of either the zero-crossing trigger or the curved path trigger can be made via an onscreen selection (see FIG. 6).

A further improvement is to incorporate hysteresis on the condition for triggering an alert. In this way, for example, if the hitch angle is zero and the hitch angle sensor has a bit of jitter (e.g., if the vehicle engine is running so roughly that its vibration causes the hitch angle sensor to vibrate about zero for slightly negative and slightly positive hitch angle readings), a hysteresis threshold would be set to require that the reading must exceed the threshold to either side before a reading to the opposite side will be recognized to cause an alert. For example, if the jitter is ±0.3° a threshold of greater than 0.3° would be used such that the alert is triggered when the hitch angle value is greater than 0.3° or less than −0.3°.

Another useful feature to provide to an operator while backing up with a trailer is a way to know if the curve on which the vehicle and trailer are backing is a constant curve (when the vehicle and trailer are backing with an identical turning radius), or if the curve is getting larger or smaller. In this regard, a graphic representation of the trailer's turning radius is displayed proximate to a graphic representation of the vehicle's turning radius (FIGS. 10-13). By comparing the two graphic representations, the operator knows if the curve on which the vehicle and trailer are backing is constant, increasing, or reducing. Alternatively, a graphic representation of the difference between the vehicle's turning radius and the trailer's turning radius (FIG. 14) can be displayed.

Figure 10:
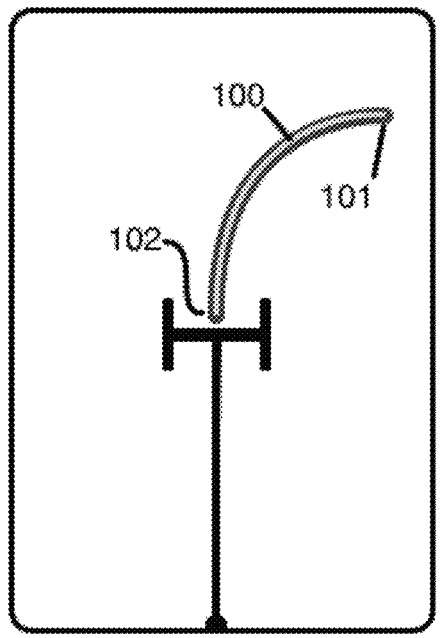
FIG. 10 depicts a graphical representation of the trailer and vehicle turning radii when the radii are the same.
Figure 11:
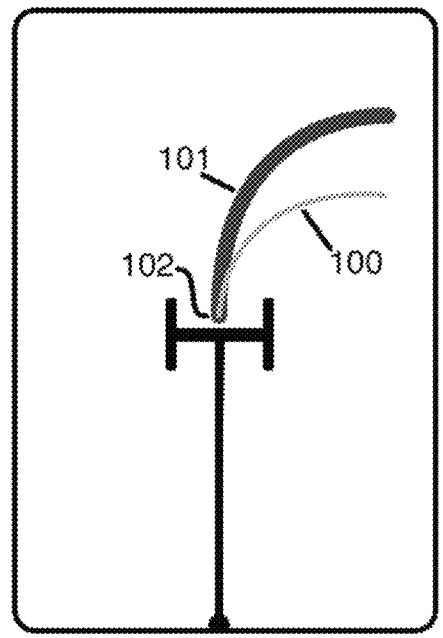
FIG. 11 depicts a graphical representation of the trailer and vehicle turning radii when the vehicle radius is tighter than the trailer radius.
Figure 12:
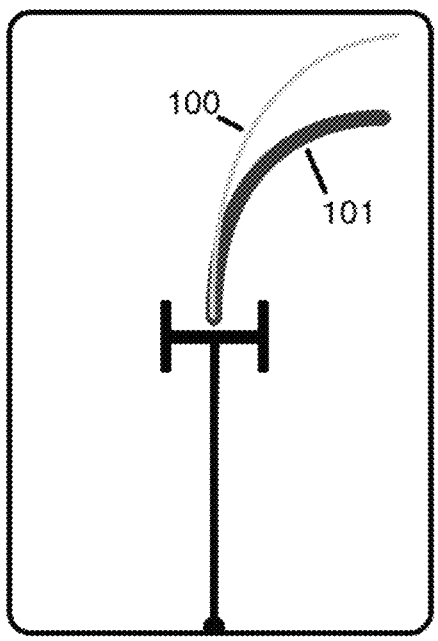
FIG. 12 depicts a graphical representation of the trailer and vehicle turning radii when the vehicle radius is wider than the trailer radius.
Figure 13:
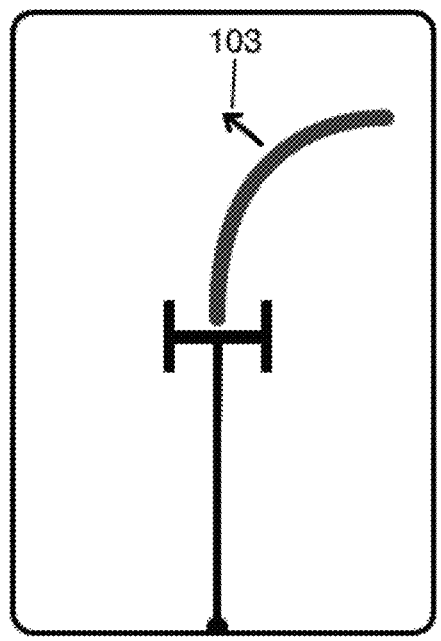
FIG. 13 depicts a graphical representation of the trailer and vehicle turning radii when the vehicle radius is tighter than the trailer radius where an arrow represents the widening trailer radius.

The vehicle's turning radius is approximated by wheelbase/tan(frontTiresAngle) and the trailer's turning radius is approximated by trailerLength/tan(hitchAngle). One form of graphic representation of a turning radius is to display an arc from a circle where the radius of the circle is directly related to the turning radius to be represented. With this approach, both the vehicle's and the trailer's turning radii can be displayed simultaneously by two arcs having a common point. For example, as depicted in FIG. 10, the vehicle turning radius curve, 100, and trailer turning radius curve, 101, arc from the center up and to the right from a common point, 102, in the center of the figure (note that if the turning radii were to have the opposite signs, the two curves would arc from the center up and to the left from the common point, 102). In this way, a user of the system can compare the trailer's curve, 101, being a representation of the trailer's path given the turning radius of the trailer, to the vehicle's curve, 100, being a representation of the vehicle's path given the turning radius of the vehicle. When the vehicle's turning radius is smaller than the trailer's turning radius, the vehicle's curve, 100, fits within the concave interior of the trailer's curve, 101 (FIG. 11). When the vehicle's turning radius is larger than the trailer's turning radius, the trailer's drawn curve, 101, fits within the concave interior of the vehicle's curve, 100 (FIG. 12). In either case, the trailer's curve moves away from the vehicle's curve while backing. When, as in FIG. 10, the trailer's curve and the vehicle's curve overlap (i.e., their turning radii are the same), the hitch angle will remain generally the same and the trailer will, in principle, follow a circular path. If, as in FIG. 11, the vehicle's turning radius is smaller than the trailer's turning radius, the vehicle will be turning faster than the trailer and the hitch angle will move towards zero and the trailer's turning radius will be getting larger. But if, as in FIG. 12, the vehicle's turning radius is larger than the trailer's turning radius, the hitch angle will be getting bigger and the trailer's turning radius will be getting smaller (moving in the direction of a jackknife). With this information, the user can steer the trailer traveling on a curve to steer to a wider curve or a smaller curve. Alternate graphic representations can include having the trailer curve, 101, displayed along with an arrow (103 in FIG. 13) or arrows to indicate the direction of changing turning radius (pointing towards the center point of the circle on which the arc lies if the turning radius is decreasing and, as in FIG. 13, pointing away from that center point if the turning radius is increasing, with the length of the arrow drawn to represent the magnitude of the rate of change), animated to look like the curve is shrinking or expanding (105 in FIG. 15) by drawing additional curves where the additional curves are each successively drawn (each spaced by regular time intervals) with a changing turning radius (drawn successively smaller if the turning radius is decreasing and drawn successively larger if the turning radius is increasing), where the curve is actually straight (i.e., a line), or by other means to indicate the changing turning radius of the trailer given the turning radius of the vehicle.

A simple form of the present invention is implemented with a hitch angle sensor comprising a either a zero-crossing detector (e.g., as in FIG. 7) to detect if the hitch angle is positive or negative (or, more simply, a zero detector to detect if the hitch angle is equal to zero) and an alerting device such as a strobe light or a beeper that will flash or honk, respectively, when the hitch angle either equals or crosses through zero. This is necessarily the minimum form such a system can take in that it provides the necessary notification of when the operator must reverse the rotation of the steering wheel without requiring the operator to monitor an output device instead of watching the surroundings of the vehicle and trailer. While such a system lacks an indication of the sign and magnitude of the required steering wheel rotation, for one only seeking to backup straight, such a system can nonetheless provide the necessary guidance to back up in a straight line.

Safe operation requires the operator to be focused on the surroundings of the vehicle and trailer. But, a steering delay results when the hitch angle crosses through zero while the operator doesn't happen to be looking at the display device.

This delay—the time from the zero-crossing until the operator next looks at the display device and reacts to it—will often result in the trailer turning too far because continuing to steer the vehicle to the first side once the trailer has crossed to the second side results in very rapid additional rotation by the trailer to that second side.

Operation of such a system requires the operator to initially steer hard to the side the trailer is on (i.e., to steer the vehicle enough that its turning radius is certain to be tighter than the turning radius of the trailer). When the system alerts that the trailer is crossing to the other side (i.e., the hitch angle is passing through zero), the operator instantly reverses the steering to that opposite (second) side. This instant reversal of the steering only requires modest steering to the second side to achieve a tighter vehicle turning radius than the trailer's turning radius because at the moment of the alert, the trailer's turning radius, which is proportional to 1/tan(hitchAngle), is passing through infinity. As long as there is little delay from the moment of the alert, the trailer's turning radius will still be extremely large and steering the vehicle to a tighter turning radius will not require much steering wheel rotation. Thereafter, with each successive alerting beep or flash, the operator need only instantly reverse the steering in a similar fashion in order to backup straight. The mechanism at play is reversing the steering as close as possible to when the hitch angle crosses through zero and the trailer's turning radius is passing through infinity. Achieving this without such a system is difficult for many operators because many operators cannot discern to which side of the vehicle the trailer is turned when the hitch angle is very close to zero. By the time they can tell that the trailer has crossed to the other side, the hitch angle is already too far past zero (and the trailer's turning radius has become too small) for them to make the correction without a large steering adjustment; when the required steering adjustment is large, the possibility of under-steering causes many operators to compensate by "playing it safe" and over-steering.

Alternate values to display are the hitch angle and the effective vehicle steering angle. Because turning radius can range from a small value (corresponding to turning on a very tight circle) to a very large number or even infinity (when the path is close to straight or straight) and values are non-linear (a small steering adjustment when the steering is close to straight can change the turning radius value by a large amount whereas that same adjustment when the turning radius is small can result in a smaller change in turning radius), displaying the turning radius of both the trailer and the vehicle may be less intuitive to some users. It may be easier for such users to look at values for the hitch angle and an effective steering angle. One expects the two values to be equal when the turning radii are the same, but the steering angle will differ from the hitch angle as a function of the wheelbase of the vehicle. To adjust for this by normalizing steering angle to the trailer length, the turning radius of the vehicle is calculated and then is converted back to an angle using the value for the trailer length. Generally, the effective steering angle is equal to arctan(trailerLength/(wheelbase/tan(frontTiresAngle))). Alternatively, hitch angle could be normalized to the wheelbase. The display can then show to the driver the turning radii to compare by basing the display on the hitch angle value and this effective steering angle value.

Stated another way, from an operator's standpoint, the relative value of the trailer's turning (whether in the form of an angle, a turning radius, a percentage of a reference direction, or otherwise) that can be compared to the relative value of the vehicle's turning (whether in the form of an angle, a turning radius, a percentage of a reference direction, or otherwise), whether provided to the driver as two graphical elements (e.g., two curves), two numerical values, or combined (e.g., by subtraction or division) into a single graphical element or numerical value is what the operator needs. Simply providing the front tire angle along with the hitch angle does not provide the necessary information because it overlooks the wheelbase and trailer length, both of which are critical parts of the turning radius calculation.

The graphic shapes or indicators are how the output device represents the underlying values being output. Alternate graphic indicators can include having the trailer curve be displayed along with arrows (103 in FIG. 13) to represent the direction of changing turning radius, be shown by a slider (104 in FIG. 14) to represent the difference between the vehicle's and trailer's turning radii, with zero being the mid-point and sliding to indicate a wider (W) or tighter (T) trailer turning path, be animated 105 to look like the curve is shrinking or expanding by drawing additional curves where the additional curves are each successively drawn (each spaced by regular time intervals) with a changing turning radius drawn successively smaller if the turning radius is decreasing and drawn successively larger if the turning radius is increasing (105 in FIG. 15), or other representations to indicate the changing turning radius of the trailer (sign and magnitude) given the turning radius of the vehicle. Furthermore, these graphic indicators can be displayed on any digital display or analog display; this includes superimposing the graphic indicator on the image from a rearview camera (i.e., a backup display). In particular, the trailer turning radius curve can be superimposed onto the rearview camera image such that the curve approximates the curve of the trailer's turning radius in the image as it would actually occur in the image if painted on the ground, as is well known in the prior art. Then, additional indicators could be displayed to represent the direction in which the curve of the trailer's turning radius will change (the sign of the change) and how quickly it will change (the magnitude of the change). For example, while the direction of the arrow 103 indicates the direction of changing turning radius (the sign of the change), the size of the arrow can be scaled larger or smaller as a function of the magnitude of the change to indicate how great or gradual the change.

Audio indication of changing turning radius (FIG. 16) can also be utilized either alone or in conjunction with the graphic mechanisms described above. An audio tone can convey information via frequency, change in frequency, length of tone (pulse duration), time between pulses (quiet duration), length of pulse burst (e.g., number of pulses in a burst), time between tone bursts, pulse rate (speed of pulses), and others. An audio tone could have two audible components where one component could be beep duration (i.e., short beeps or "dot" beeps and long beeps or "dash" beeps) for the sign of the change and beep rate (i.e., the quiet time between beeps could get longer or shorter) for the magnitude; this beeping mechanism could indicate a tightening trailer turning radius with dot beeps where the beep rate indicates how rapidly the trailer turning radius is tightening (a fast rate for a rapidly tightening change and a slow rate for a gradually tightening change), and could indicate a widening trailer turning radius with dash beeps where the beep rate indicates how rapidly the trailer turning radius is widening (a fast rate for a rapidly widening change and a slow rate for a gradually widening change). Alternatively, a shifting tone could be used where the tone begins with a low pitch and ends with a high pitch for a tightening trailer turning radius (or begins with a high pitch and ends with a low pitch for a widening trailer turning radius) with the tone changing continuously from its beginning pitch to its ending pitch throughout the duration of the tone to represent the sign of the change; the magnitude of the change could be represented by the duration of the tone where a longer duration tone represents a slower rate of change and a shorter duration tone represents a more rapid rate of change. A tone that is steady in duration and pitch could represent a neither tightening or widening trailer turning radius.

An alternate audio indication can include pitch bending or, where one tone corresponds to the turning radius of the trailer and a second tone corresponds to the turning radius of the vehicle, frequency shifting whereby the tones change their pitch higher or lower depending on if the turning radius is greater or smaller than the other, respectively; this will result in a pure tone if the radii match but will create a harmonic beat frequency when the tones and the radii do not match. An alternate audio indication can include a tone on the left speaker or the right speaker of a stereo speaker system to indicate to which side of the vehicle that the trailer is on or to which side of the trailer's turning radius that the vehicle's turning radius is on (i.e., information conveyed by the location of the sound source).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

I claim:

1. A system for backing up a trailer by a towing vehicle, the trailer and the vehicle being coupled together by a jointed connection where the jointed connection has a continuous plurality of connection angles and where each connection angle has a corresponding turning radius for the trailer, the vehicle having a continuous plurality of steering positions where each steering position has a corresponding turning radius of the vehicle, comprising: an alerting device, a computing device that computes one or more of the turning radius for the trailer from a measurement of the jointed connection and the turning radius for the vehicle from a measurement of the steering position, an alert that (i) is emitted by the alerting device and received by an operator of the system without requiring the operator to look directly at the alerting device, and (ii) is a general indication of the difference between the turning radii of the vehicle and trailer becoming zero or crossing through zero, or a general indication of the connection angle becoming equal to or crossing through an angle corresponding to an intended turning radius for the vehicle and trailer.

2. The system of claim 1 further comprising a first measuring device for determining a value representing the connection angle.

3. The system of claim 1 further comprising a first measuring device for determining the connection angle, a second measuring device for determining the steering position, one or more calculating devices comprised by one or more of the first measuring device, the second measuring device, and the computing device, that compute a first value that represents the turning radius of the trailer or its equivalent by using data from the first measuring device and a second value that represents the turning radius of the vehicle or its equivalent by using data from the second measuring device.

4. The system of claim 3 further comprising a display device to indicate to an operator one or more of (i) a first visual representation of the first value and a second visual representation of the second value, and (ii) a visual representation of the difference between the first value and the second value.

5. The system of claim 4 wherein the display device comprises the alerting device and is selected from a list of devices that can act as both a display device and an alert device, the list comprising a smart phone, a tablet, a computer, a laptop, a smart watch, and a custom made device.

6. The system of claim 4 wherein the first value and the second value are displayed such that the operator is able to compare the values they represent.

7. The system of claim 6 wherein the displayed values further comprise a graphic shape that is not an alphanumerical shape.

8. The system of claim 4 wherein the visual representation of the difference between the first and second value comprise one or more graphic elements selected from a list of possible elements, the list comprising of a slider, a scale, a sliding scale, an animation, an arrow, an arrow of variable length or size, a line or curved line, and a line or curved line of variable length or size.

9. The system of claim 1 wherein the alert emitted comprises one or more of an audible signal, a visual signal, and a tactile signal.

10. The system of claim 9 wherein the visual signal comprises a flash of light adapted to be perceived by an operator peripherally or ambiently.

11. The system of claim 1 wherein the alerting device is adapted to allow the operator to perceive the alert using his or her senses of vision, hearing, or touch.

12. The system of claim 1 further comprising: (i) an average value for the connection angle,
   (ii) a count corresponding to a number of recent connection angle measurements to average together to compute the average, and (iii) a list comprising a quotient computed for each of the count connection angle measurements, where with each new connection angle measured, a new average value is computed by:
   (1) calculating a new quotient by dividing the new connection angle measurement by the count, (2) subtracting from the average a quotient in the list corresponding to the connection angle value least recently measured, (3) replacing the quotient in the list corresponding to the connection angle value least recently measured with the new quotient, and (4) adding the new quotient to the average.

13. The system of claim 1 where an alert is prevented from being emitted twice for the trailer being on one side of an intended path without an intervening alert occurring for the trailer being on the opposite side.

14. A system for backing up a trailer by a towing vehicle, the trailer and the vehicle being coupled together by a jointed connection where the jointed connection has a continuous plurality of connection angles and where each connection angle has a corresponding turning radius that defines an arc of constant turning radius for the trailer, the vehicle having a continuous plurality of steering positions where each steering position has a corresponding turning radius that defines an arc of constant turning radius of the vehicle, and where (a) the connection angle moves towards jackknife when the arc of the vehicle is less concave than the arc of the trailer, (b) the connection angle moves away from jackknife when the arc of the vehicle is more concave than the arc of the trailer, and (c) the connection angle is unchanged when the arc of the vehicle matches the arc of the trailer, comprising:
- a computing device that computes one or more of (i) a turning radius from a measurement of the jointed connection, (ii) a turning radius from a measurement of the steering position, and (iii) a connection angle to be maintained at the jointed connection corresponding to a desired turning radius, an alerting device, and an alert that is emitted by the alerting device and received by an operator of the system without requiring the operator to look directly at the alerting device, where the alert is emitted
- when the connection angle crosses through the connection angle to be maintained at the jointed connection corresponding to the desired turning radius, or
- when the arc of the trailer relative to the arc corresponding to the desired turning radius transitions from less convex to more convex or from more convex to less convex.

15. The system of claim 14 where the alert received by the operator informs the operator to adjust the steering to maintain a generally unchanged connection angle by steering to change the arc of the trailer relative to the arc of the vehicle to being (i) less convex if the alert occurred due to the arc of the trailer relative to the arc of the vehicle having transitioned from being less convex to being more convex, or (ii) more convex if the alert occurred due to the arc of the trailer relative to the arc of the vehicle having transitioned from being more convex to being less convex.

16. The system of claim 14 where an alert is prevented from being emitted twice for when the arc of the trailer relative to the arc of the vehicle transitions from less convex to more convex without an intervening alert occurring for when the arc of the trailer relative to the arc of the vehicle transitions from more convex to less convex or when the arc of the trailer relative to the arc of the vehicle transitions from more convex to less convex without an intervening alert occurring for when the arc of the trailer relative to the arc of the vehicle transitions from less convex to more convex.

17. The system of claim 14 wherein the alert emitted comprises one or more of an audible signal, a visual signal, and a tactile signal.

18. The system of claim 17 wherein the visual signal comprises a flash of light adapted to be perceived by an operator peripherally or ambiently.

19. The system of claim 14 further comprising a display device to indicate to an operator one or more of (i) a first visual representation of the arc of the vehicle and a second visual representation of the arc of the trailer, and (ii) a visual representation of the difference between the arc of the vehicle and the arc of the trailer.

20. The system of claim 19 wherein the display device comprises the alerting device and is selected from a list of devices that can act as both a display device and an alert device, the list comprising a smart phone, a tablet, a computer, a laptop, a smart watch, and a custom made device.

* * * * *